United States Patent
Grimm et al.

(10) Patent No.: US 10,745,006 B2
(45) Date of Patent: Aug. 18, 2020

(54) MANAGING AUTOMATED DRIVING COMPLEXITY OF THE FORWARD PATH USING PERCEPTION SYSTEM MEASURES

(71) Applicant: GM Global Technology Operations LLC, Detroit, MI (US)

(72) Inventors: Donald K. Grimm, Utica, MI (US); Wei Tong, Troy, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 15/886,492

(22) Filed: Feb. 1, 2018

(65) Prior Publication Data
US 2019/0232955 A1   Aug. 1, 2019

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/12* (2013.01);
(Continued)

(58) Field of Classification Search
CPC .. B60W 30/09; B60W 30/0956; B60W 30/12; G06N 20/00; G05D 1/0221
See application file for complete search history.

(56) References Cited

U.S. PATENT DOCUMENTS 8,352,112 B2 *   1/2013   Mudalige ............... G08G 1/22
                                                         340/435
9,507,346 B1 *  11/2016   Levinson ............. G05D 1/0214
(Continued)

FOREIGN PATENT DOCUMENTS

DE        102015005703 A1 *  11/2016  ............ B60W 40/12

OTHER PUBLICATIONS

Pendleten, et. al., Perception, Planning, Control, and Coordination for Autonomous Vehicles, Feb. 17, 2017 (Year: 2017).*
(Continued)

*Primary Examiner* — Anne Marie Antonucci
*Assistant Examiner* — Sahar Motazedi
(74) *Attorney, Agent, or Firm* — Cantor Colburn LLP (57) ABSTRACT

Technical solutions are described for controlling an automated driving system of a vehicle. An example method includes computing a complexity metric of an upcoming region along a route that the vehicle is traveling along. The method further includes, in response to the complexity metric being below a predetermined low-complexity threshold, determining a trajectory for the vehicle to travel in the upcoming region using a computing system of the vehicle. Further, the method includes in response to the complexity metric being above a predetermined high-complexity threshold, instructing an external computing system to determine the trajectory for the vehicle to travel in the upcoming region. If the trajectory cannot be determined by the external computing system a minimal risk condition maneuver of the vehicle is performed.

18 Claims, 5 Drawing Sheets

(51) Int. Cl.
*B60W 30/12* (2020.01)
*G05D 1/02* (2020.01)
*G06N 3/08* (2006.01)
*G06N 3/04* (2006.01)
*G06N 20/00* (2019.01)

(52) U.S. Cl.
CPC ......... *G05D 1/0221* (2013.01); *G06N 3/0445* (2013.01); *G06N 3/08* (2013.01); *G06N 20/00* (2019.01)

(56) References Cited

U.S. PATENT DOCUMENTS

| | | | | |
|---|---|---|---|---|
| 9,805,601 | B1* | 10/2017 | Fields | G08G 1/096791 |
| 9,817,400 | B1* | 11/2017 | Poeppel | G06Q 10/20 |
| 9,841,286 | B1* | 12/2017 | Hayward | G01C 21/34 |
| 2011/0190972 | A1* | 8/2011 | Timmons | G01C 21/34 701/31.4 |
| 2013/0041548 | A1* | 2/2013 | Krautter | B60R 25/00 701/25 |
| 2016/0358475 | A1* | 12/2016 | Prokhorov | G05D 1/0011 |
| 2017/0277193 | A1* | 9/2017 | Frazzoli | G05D 1/0214 |
| 2017/0356750 | A1* | 12/2017 | Iagnemma | G01C 21/3461 |
| 2018/0001890 | A1* | 1/2018 | Ratcliffe | G06K 9/00791 |
| 2018/0004204 | A1* | 1/2018 | Rider | B60K 35/00 |
| 2018/0004211 | A1* | 1/2018 | Grimm | G01C 21/3407 |
| 2018/0211536 | A1* | 7/2018 | Akamine | G08G 1/166 |
| 2018/0251126 | A1* | 9/2018 | Linscott | G05D 1/0055 |
| 2019/0061782 | A1* | 2/2019 | Cheaz | B60W 50/14 |
| 2019/0077458 | A1* | 3/2019 | Khlifi | B62D 15/0265 |
| 2019/0086932 | A1* | 3/2019 | Fan | G08G 1/16 |
| 2019/0146493 | A1* | 5/2019 | Phillips | G05D 1/021 |
| 2019/0186936 | A1* | 6/2019 | Ebner | B60W 40/02 |
| 2019/0202467 | A1* | 7/2019 | Sun | B60W 50/082 |
| 2019/0205667 | A1* | 7/2019 | Avidan | G06K 9/00791 |
| 2019/0294167 | A1* | 9/2019 | Kutila | G01C 21/3461 |

OTHER PUBLICATIONS

Jo, et. al., Development of Autonomous Car-Part II: A Case Study on the Implementation of an Autonomous Driving System Based on Distributed Architecture, Aug. 2015, vol. 62 (Year: 2015).*

Jo, et. al., Development of Autonomous Car-Part I: Distributed System Architecture and Development Process, Dec. 2014, vol. 61 (Year: 2014).*

Machine Translation of DE102015005703 (Year: 2016).*

* cited by examiner

MANAGING AUTOMATED DRIVING COMPLEXITY OF THE FORWARD PATH USING PERCEPTION SYSTEM MEASURES

INTRODUCTION

The subject disclosure generally relates to an automated driving system for a vehicle, and particularly to using perception system complexity information to support conditional and high automation levels.

Autonomous vehicles can operate in various operational modes. For example, in a "fully-automated" operational mode (sometimes referred to as Level 5 automation by National Highway Transportation Safety Agency (NHTSA)) a computing system is used to navigate and/or maneuver the vehicle along a travel route with no input from a human driver. In a "semi-automated" operational mode (Level 3 automation per NHTSA), the vehicle can perform full self-driving functions, but may need human intervention in various situations or may request the driver to take control (with some amount of delay allowed in the response). There are various other operational modes that facilitate functions like anti-lock brakes, electronic stability control, lane-keeping and the like. Further, in one or more operational modes, multiple functions are combined, such as the combination of adaptive cruise control and lane-keeping to make a car that drives itself but needs constant human monitoring and quick intervention; or self-park monitored from outside the vehicle.

To facilitate such automated functions the vehicles are equipped with sensors that are configured to detect information about the surrounding environment, including the presence of objects in the environment. The detected information can be sent to the computing system. Different operational modes and driving scenarios may use different types and amounts of computing resources. Level 3 systems predict when a future driver takeover is required based on the increased complexity of the driving environment. Level 4 automated driving systems are currently limited to small, geo-fenced areas and low speed operation due to the potential computational complexity involved when the vehicle encounters certain situations. As such, these systems also use details about the complexity of the upcoming environment in order to allocate computing resources in a way that enables the system to fulfill its mission.

Accordingly, it is desirable to provide improved vehicle automation systems that can track overall driving complexity to predict when automated driving functions may become unavailable (for the purpose of driver takeover or utilization of elastic computing resources). The proposed techniques may also be used to automatically determine which operational mode to use and allocate computing resources according to the determined operational mode, and further switch operational mode based on available computing resources.

SUMMARY

Technical solutions are described for controlling an automated driving system of a vehicle. An example method includes computing a complexity metric of an upcoming region along a route that the vehicle is traveling along. The method further includes, in response to the complexity metric being below a predetermined low-complexity threshold, determining a trajectory for the vehicle to travel in the upcoming region using a computing system of the vehicle. Further, the method includes in response to the complexity metric being above a predetermined high-complexity threshold, instructing an external computing system to determine the trajectory for the vehicle to travel in the upcoming region. If the trajectory cannot be determined by the external computing system a minimal risk condition maneuver of the vehicle is performed.

In one or more examples, the method further includes, in response to the complexity metric being between the low-complexity threshold and the high-complexity threshold, adjusting the computing system of the vehicle by reallocating computational resources of the computing system of the vehicle, and instructing the adjusted computing system of the vehicle to determine the trajectory for the vehicle to travel in the upcoming region. If the trajectory cannot be determined by the computing system a minimal risk condition maneuver of the vehicle is performed.

In one or more examples, computing the complexity metric includes computing an individual sensor's complexity metric based on sensor data captured by one or more sensors of the vehicle. Further, computing the complexity metric includes computing a sensor fusion complexity metric based on sensor fusion data that is determined based on sensor data captured by one or more sensors of the vehicle. Further, computing the complexity metric includes computing an object tracking complexity metric based on a number of stably tracked objects from sensor data and a total number of objects tracked by one or more sensors of the vehicle. In one or more examples, the complexity metric is computed as $r=\Sigma_{i=1}^{m} w_i p_i$, where $p_i$ is an $i^{th}$ parameter comprising an environmental factor or a complexity-value computed using sensor data from one or more sensors of the vehicle, $w_i$ is a weight associated with the $i^{th}$ parameter, and m is a total number of parameters. In one or more examples, the complexity metric is computed using machine learning based on a time series analysis of sensor data captured by one or more sensors of the vehicle.

Further, the method includes generating an alert for a driver of the vehicle to take control of the vehicle at least a predetermined time interval prior to reaching the upcoming region.

According to one or more embodiments an automated driving system of a vehicle is described. The system includes one or more object sensors, a computing system, and a controller coupled with the one or more sensors and the computing system, the controller configured to determine an operational mode of the automated driving system. Determining the operational mode includes at least one of determining a trajectory for the vehicle to travel in an upcoming region along a route that the vehicle is traveling along, the trajectory to be determined using an internal computing system of the vehicle, and instructing an external computing system to determine the trajectory for the vehicle to travel in the upcoming region, and performing a minimal risk condition maneuver of the vehicle if the trajectory cannot be determined by the external computing system.

Further, determining the operational mode includes adjusting the computing system of the vehicle by reallocating computational resources of the computing system of the vehicle. Further, it includes instructing the adjusted computing system of the vehicle to determine the trajectory for the vehicle to travel in the upcoming region. Further yet, it includes performing a minimal risk condition maneuver of the vehicle if the trajectory cannot be determined by the computing system.

In one or more examples, the controller computes a complexity metric of the upcoming region, wherein computing the complexity metric comprises computing an individual sensor's complexity metric based on sensor data captured by the one or more sensors. For example, computing the complexity metric includes computing a sensor fusion complexity metric based on sensor fusion data that is determined based on sensor data captured by the one or more sensors.

Further, computing the complexity metric includes computing an object tracking complexity metric based on a number of stably tracked objects from sensor data and a total number of objects tracked by one or more sensors of the vehicle. In one or more examples, the complexity metric is computed as $r=\Sigma_{i=1}^{m} w_i p_i$, where $p_i$ is an $i^{th}$ parameter comprising an environmental factor or a complexity-value computed using sensor data from one or more sensors of the vehicle, $w_i$ is a weight associated with the $i^{th}$ parameter, and m is a total number of parameters. In one or more examples, the complexity metric is computed using machine learning based on a time series analysis of sensor data captured by one or more sensors of the vehicle.

Further, in one or more examples, the controller generates an alert for a driver of the vehicle to take control of the vehicle at least a predetermined time interval prior to reaching the upcoming region.

According to one or more embodiments of an automated vehicle are described. An automated vehicle includes a communication system, and a controller coupled with the communication system. The controller determines an operational mode of the automated driving system by executing a method that includes computing a complexity metric of an upcoming region along a route that the vehicle is traveling along. The method further includes, in response to the complexity metric being below a predetermined low-complexity threshold, determining a trajectory for the vehicle to travel in the upcoming region using a computing system of the vehicle. Further, the method includes in response to the complexity metric being above a predetermined high-complexity threshold, instructing an external computing system to determine the trajectory for the vehicle to travel in the upcoming region. If the trajectory cannot be determined by the external computing system a minimal risk condition maneuver of the vehicle is performed.

In one or more examples, the controller, in response to the complexity metric being between the low-complexity threshold and the high-complexity threshold, adjusts the computing system of the vehicle by reallocating computational resources of the computing system of the vehicle, and instructs the adjusted computing system of the vehicle to determine the trajectory for the vehicle to travel in the upcoming region. If the trajectory cannot be determined by the computing system a minimal risk condition maneuver of the vehicle is performed.

In one or more examples, computing the complexity metric includes computing an individual sensor's complexity metric based on sensor data captured by one or more sensors of the vehicle. Further, computing the complexity metric includes computing a sensor fusion complexity metric based on sensor fusion data that is determined based on sensor data captured by one or more sensors of the vehicle. Further, computing the complexity metric includes computing an object tracking complexity metric based on a number of stably tracked objects from sensor data and a total number of objects tracked by one or more sensors of the vehicle. In one or more examples, the complexity metric is computed as $r=\Sigma_{i=1}^{m} w_i p_i$, where $p_i$ is an $i^{th}$ parameter comprising an environmental factor or a complexity-value computed using sensor data from one or more sensors of the vehicle, $w_i$ is a weight associated with the $i^{th}$ parameter, and m is a total number of parameters. In one or more examples, the complexity metric is computed using machine learning based on a time series analysis of sensor data captured by one or more sensors of the vehicle.

Further, in one or more examples, the controller generates an alert for a driver of the vehicle to take control of the vehicle at least a predetermined time interval prior to reaching the upcoming region The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Generally, automated or autonomous vehicles include at least some aspects of a safety-critical control function, e.g., steering, throttle, or braking, occur without direct driver input. In one or more examples, vehicles that provide safety warnings to drivers but do not perform a control function are, in this context, not considered automated, even though the technology necessary to provide that warning involves varying degrees of automation. Automated vehicles may use on-board sensors, cameras, global positioning system (GPS), and telecommunications to obtain environment information in order to make judgments regarding safety-critical situations and operate appropriately by effectuating control at some automation level.

Vehicle automation has been classified by the Society of Automotive Engineers International (SAE) to range from no automation through full automation in SAE J3016™—classification of driving automation levels in on-road motor vehicles. In general, SAE J3016™ levels and definitions include Level 0—No Automation: The full-time performance by the human driver of all aspects of the dynamic driving task, even when enhanced by warning or intervention systems; Level 1—Driver Assistance: The driving mode-specific execution by a driver assistance system of either steering or acceleration/deceleration using information about the driving environment and with the expectation that the human driver performs all remaining aspects of the dynamic driving task; Level 2—Partial Automation: The driving mode-specific execution by one or more driver assistance systems of both steering and acceleration/deceleration using information about the driving environment and with the expectation that the human driver performs all remaining aspects of the dynamic driving task; Level 3—Conditional Automation: The driving mode-specific performance by an Automated Driving System of all aspects of the dynamic driving task with the expectation that the human driver will respond appropriately to a request to intervene; Level 4—High Automation: The driving mode-specific performance by an Automated Driving System of all aspects of the dynamic driving task, even if a human driver does not respond appropriately to a request to intervene; and Level 5—Full Automation: The full-time performance by an Automated Driving System of all aspects of the dynamic driving task under all roadway and environmental conditions that can be managed by a human driver.

For example, in a "full automation" operational mode, referred to as Level 5 automation by the SAE J3016™, a computing system is used to navigate and/or maneuver the vehicle along a travel route with no input from a human driver. The full automation in this mode performs all safety-critical driving functions and monitors roadway conditions for an entire trip and may need only that the driver provide destination or navigation input, but not control at any time during the trip. Such full automation includes both occupied and unoccupied autonomous vehicles.

In a "semi-automated" operational mode (Level 2/3 automation), the vehicle can perform full self-driving functions but needs human intervention in various situations or may request the driver to take control (with some amount of delay allowed in the response). Lower Level operational modes facilitate functions like anti-lock brakes, electronic stability control, lane-keeping and the like. Further, in one or more operational modes, multiple functions are combined, such as the combination of adaptive cruise control and lane-keeping to make a car that drives itself but needs constant human monitoring and quick intervention; or self-park monitored from outside the vehicle.

However, the development and testing of Level 4 automated driving systems has currently been limited to small, geo-fenced areas and low speed operation due to the potential computational complexity involved. Widespread deployment of Level 4 systems is challenged by their inability to function over all operational design domains. The technical solutions described herein address such technical challenges of automated driving systems by using driving complexity trend information to enable Level 3 functionality or overcome limitations of Level 4 systems via offloading computational operations used by the Level 4 automation processing.

As described earlier, to facilitate automated functions, vehicles are equipped with sensors that are configured to detect information about the surrounding environment, including the presence of objects in the environment. The detected information is sent to a computing system. Different operational modes use different types and amounts of computing resources. The technical solutions described herein determine computational resources used by the different operational modes. Further, the technical solutions determine amounts of information available, and predict computational resources required to analyze the available information for the different operation modes. Based on the computational resources available and the amount and/or type of information available, the technical solutions described herein facilitate determining the operational mode to be used and switches from the present operation mode to the determined operation mode, if required.

The technical solutions described herein facilitate an automated vehicle to enable and provide Level 3 functionality by predicting when automated driving functions cannot be available due to the increasing complexity of the environment. Alternatively, or in addition, the automated vehicle can sustain Level 5 functionality by enlisting support from off-board computing systems when the environment becomes too complex for the computing systems equipped in the vehicle to negotiate ("cry for help"). Alternatively, or in addition, the automated vehicle can sustain Level 5 functionality by intelligently allocating computing resources in the computing system equipped in the vehicle or the off-board computing system in difficult environments to focus on region of interest. It should be noted that the technical solutions described herein also facilitate the automated vehicle to switch from and/or to other operational modes than those listed above, which are just few possible examples.

Figure 1:
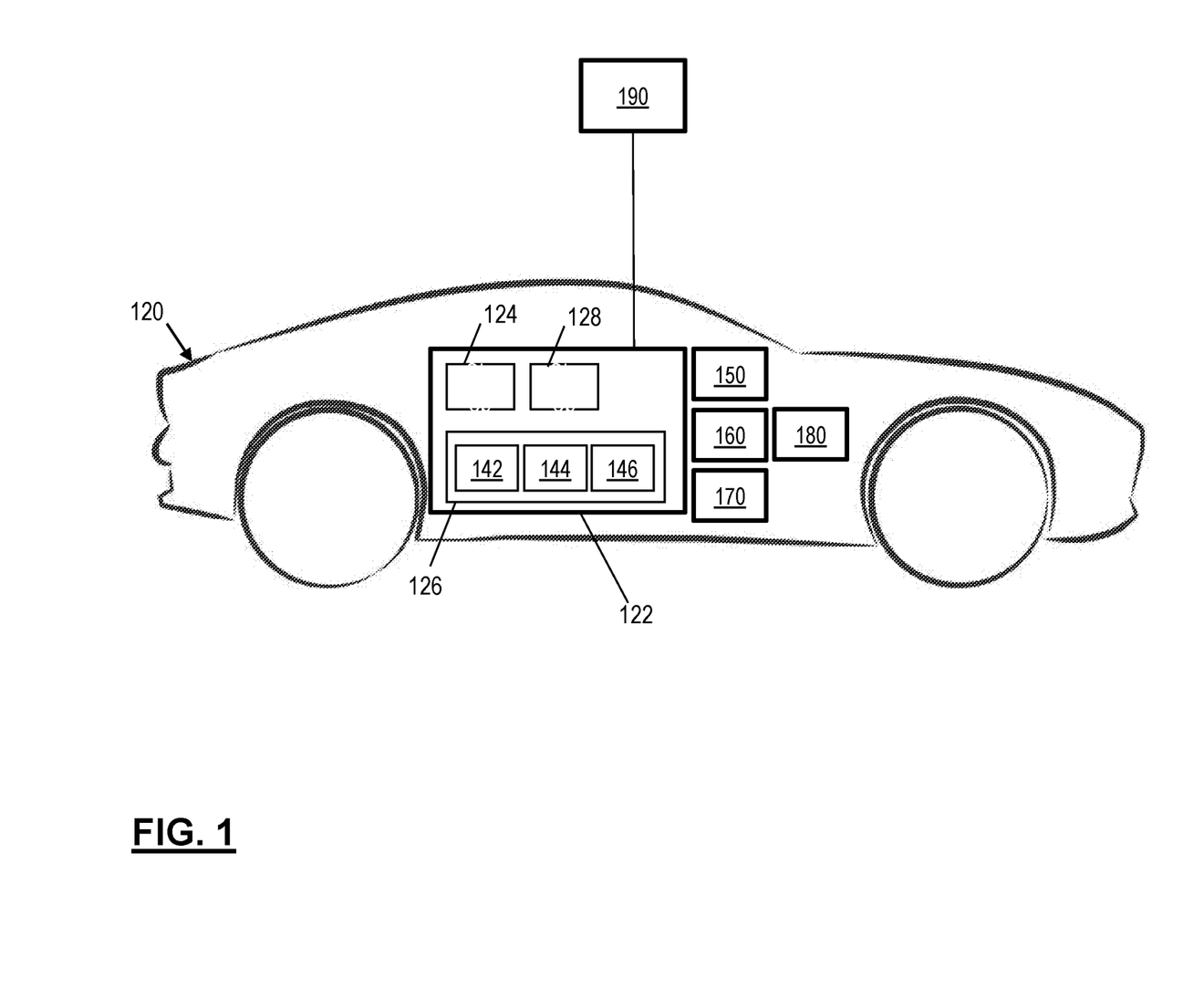
FIG. 1 illustrates a vehicle with an automated driving system according to one or more embodiments.

Referring now to FIG. 1, an automated vehicle is depicted according to one or more embodiments. FIG. 1 schematically illustrates a vehicle 120 with an automated driving system 122. The automated driving system 122 generally includes a sensor system 124, a control system 126 and a communication system 128. It should be appreciated that although particular systems are separately defined, each or any of the systems may be otherwise combined or segregated via hardware and/or software.

The sensor system 124 may include various sensors operable to identify a condition associated with and around the vehicle 120. In one or more examples, the sensor system 124 includes a surrounding monitor system that includes but is not limited to sensors such as imagery sensors, RADAR, SONAR, LIDAR and others. It should be appreciated that various sensors may alternatively or additionally be provided.

The control system 126 generally includes a processor 142, a memory 144, and an interface 146. The control system 126 may be a portion of a central vehicle control, a stand-alone unit, or other system such as a cloud-based system. The processor 142 may be any type of microprocessor having desired performance characteristics, and the memory 144 may include any type of computer readable medium that stores the data and control algorithms described herein. The interface 146 facilitates communication with other systems such as the sensor system 124, the communication system 128, and safety-critical control systems such as a braking system 150, a steering system 160, and a throttle system 170 to provide selective self-drive control of the vehicle 120 in response to the control algorithms.

In one or more examples, the driver may interact with the control system 126 through a driver vehicle interface (DVI) 180. The DVI 180 may include an instrument panel with a touch screen, keypad, or other interface as well as a steering wheel, pedals, gear shifter, and/or other vehicle control interfaces. It should be appreciated that the vehicle control interfaces for respective safety-critical control systems 150, 160, 170 are not illustrated and that various interfaces may be utilized to provide manual and self-drive operations of the vehicle 120.

The communication system 128 may be operable to receive information from off-board systems that provide information to the control algorithms to include, but are not limited to, traffic information, weather information, location information and other such information that may facilitate control and navigation of the vehicle 120. The control algorithms are operable to provide selective self-driving control of the vehicle 120 in accord with, for example, a range of vehicle automation that has been classified by agencies such as the National Highway Traffic Safety Administration (NHTSA) and SAE International from Automation Level 0 to Automation Level 5. It should be noted that alternative categorization/naming schemes of the automation levels than those described herein may be used in other embodiments.

Automation Level 0—No Automation: The driver is in complete and sole control at all times of the primary vehicle controls and is solely responsible for monitoring the roadway and for safe operation. The primary vehicle controls are braking, steering, and throttle. A vehicle with driver convenience systems that do not have control authority over steering, braking, or throttle would still be considered "Automation Level 0" vehicles. Examples of driver convenience systems include forward collision warning, lane departure warning, blind spot monitoring, and systems for automated secondary controls such as wipers, headlights, turn signals, hazard lights, etc.

Automation Level 1—Function-specific Automation: This Automation Level involves one or more specific control functions. If multiple functions are automated, they operate independently. The driver has overall control, and is solely responsible for safe operation, but can choose to cede limited authority over a primary control such as adaptive cruise control. Automated self-drive systems can provide added control in certain normal driving or crash-imminent situations e.g., dynamic brake support in emergencies. The vehicle may have multiple capabilities that combine individual driver support and crash avoidance technologies, but do not replace driver vigilance and do not assume driving responsibility from the driver. Automation Level 1 may assist or augment the driver, but there is no combination of systems that operate in unison to enable the driver to be disengaged from physically operating the vehicle by having hands off the steering wheel and feet off the pedals at the same time. Examples of function-specific automation systems include: cruise control, automatic braking, and lane keeping.

Automation Level 2—Combined Function Automation: This Automation Level involves automation of at least two primary control functions designed to work in unison to relieve the driver of control of those functions. Automation Level 2 can utilize shared authority when the driver cedes active primary control in certain limited driving situations. The driver is responsible for monitoring the roadway for safe operation and is expected to be available for control at all times and on short notice. This Automation Level can relinquish control with no advance warning and the driver must be ready to control the vehicle safely. An example of combined functions enabling Automation Level 2 is adaptive cruise control in combination with lane centering. A major distinction between Automation Level 1 and Automation Level 2 is that, at Automation Level 2 in the specific operating conditions for which the system is designed, the driver is disengaged from physically operating the vehicle with hands off the steering wheel and feet off the pedals at the same time.

Automation Level 3—Limited Self-Driving Automation: This Automation Level enables the driver to cede full control of all safety-critical functions under certain traffic or environmental conditions and in those conditions to rely heavily on the vehicle to monitor for changes in those conditions that would require transition back to driver control. The vehicle is designed to ensure safe operation during the automated driving mode and the driver is expected to be available for occasional control, but with a sufficiently comfortable transition time. An example is an automated vehicle that can determine when the system is no longer able to support automation, such as from an oncoming construction area, and then signal to the driver to reengage in the driving task. A major distinction between Automation Level 2 and Automation Level 3 is that at Automation Level 3, the driver is not expected to constantly monitor the roadway.

Level 4—High Automation: The driving mode-specific performance by an Automated Driving System of all aspects of the dynamic driving task, even if a human driver does not respond appropriately to a request to intervene.

Automation Level 5—Full Self-Driving Automation: This Automation Level performs all safety-critical driving functions and monitors roadway conditions for an entire trip. Such a design anticipates that the driver provides destination or navigation input, but is not expected to be available for control at any time during the trip. Automation Level 5 permits occupied and unoccupied vehicles as safe operation rests solely on the automated vehicle system.

It should be appreciated that although the above automation levels are utilized for descriptive purposes herein, other delineations may additionally or alternatively be provided. However, the complexity of even the automation levels described herein may result in an unclear demarcation of operating boundaries and driver interaction responsibilities. In the description herein "Level 3" is used to represent partial automation levels such as Levels 1-3, and Level 4 is used to represent high automation levels such as Levels 4-5.

The technical solutions described herein support Automation Level 3 systems by indicating when driver input will be required based on increased driving complexity and Automation Level 4 systems by indicating when utilization of elastic computing resources will be required to maintain Level 4 operation. For example, the operational mode and driving complexity trend information is used to anticipate required takeover operations (Level 3 functionality) or to overcome limitations of the onboard computing system via offloading computation to an off-board computer system 190 or via reallocation of onboard computing resources.

The off-board computer system 190 can be a computer server, or any other computing system that is separate from the control system 126 that is 'on-board' the vehicle 120. The off-board computer system 190 can be more powerful compared to the control system 126, for example, have a faster processor, have more memory, have additional computing resources such as a graphical programming unit (GPU), an artificial neural network (ANN) chip, and the like.

Figure 2:
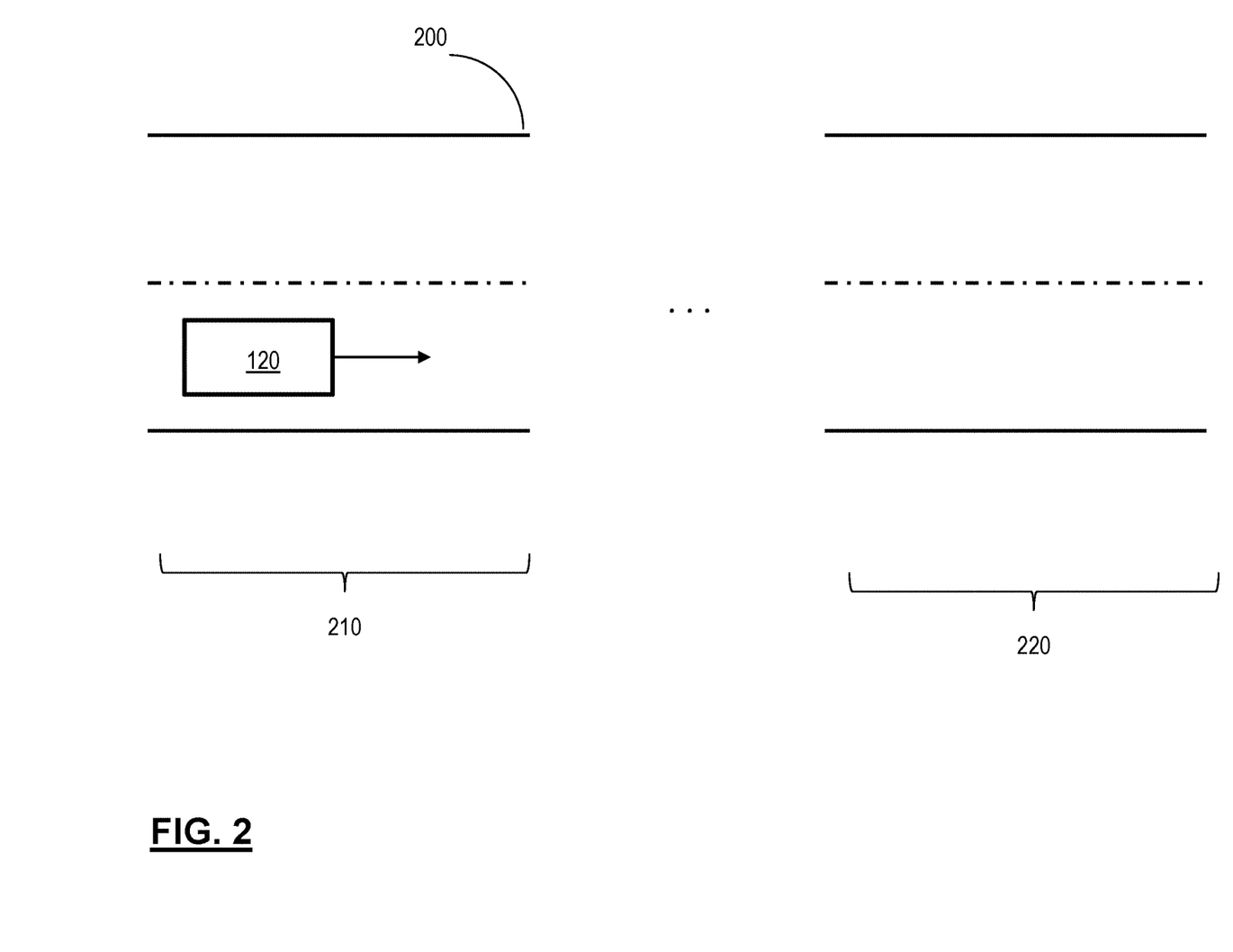
FIG. 2 depicts an example scenario of a vehicle traveling according to one or more embodiments.

FIG. 2 depicts an example scenario of a vehicle traveling according to one or more embodiments. The automated vehicle 120 is traveling along a route 200, which may be divided into one or more path segments or regions. The vehicle 120 is presently in a region 210 of the route 200. The control system 126, based on the current vehicle kinematics (speed, acceleration etc.) can predict a region 220 for the vehicle 120 at a future time, say t2. The predicted region 220 can be approaching after a predetermined time interval t2, such as 2 minutes, 1 minute, 15 minutes, and the like. In one or more examples, the time interval t2 is adjustable.

It should be appreciated that although the route 200 and the regions 210 and 220 are depicted with 'straight' lines, the route and/or regions may include curved road segments, turns, intersections, parking lots, highway exit ramps, highway entry ramps, off-road (dirt) segment, high occupancy vehicle (HOV) lane, or any other specific type of route element.

The control system 126 tracks a complexity of the environmental information of the region 220 that the vehicle 20 is approaching. Based on the complexity, the control system 126 monitors and determines an operational mode to use for automated driving system in the upcoming region 220. For example, the control system 126, based on the complexity determines whether to continue using a present automation level, such as Level 3, or to issue a takeover request to the driver. Alternatively, or in addition, the control system can determine whether to continue operating in a Level 4 automation by employing elastic computing approaches. For example, the control system 126 tracks static objects (bridges, signs, etc.), dynamic objects (vehicles, pedestrians, etc.), and objects near acceptance filter (indication of scene complexity) in the region 220. Further, the control system 126 characterizes the environment (e.g., lighting, weather, map, GPS quality, wireless quality) in the region 220. The control system 126 computes the complexity of the information for the approaching region 220 from the object data and environment measures.

In one or more examples, the control system 126 adjusts/calibrates the complexity metric based on backend parameters from crowd-sourcing aggregation from other vehicles that are in the region 220 or that have passed through the region 220 within a predetermined interval. Further, the control system 126 tracks the computed complexity metric for the region 220 as a time series and predicts when the complexity metric can exceed the ability of the vehicle 120 to operate in autonomous mode. If the forward region 220 becomes too complex, for example if the complexity metric exceeds a predetermined threshold that the vehicle 120 can process in real time for providing automated driving functions, the control system 126 performs mitigation measures or requests takeover based on the increasing trend of the complexity metric.

Figure 3:
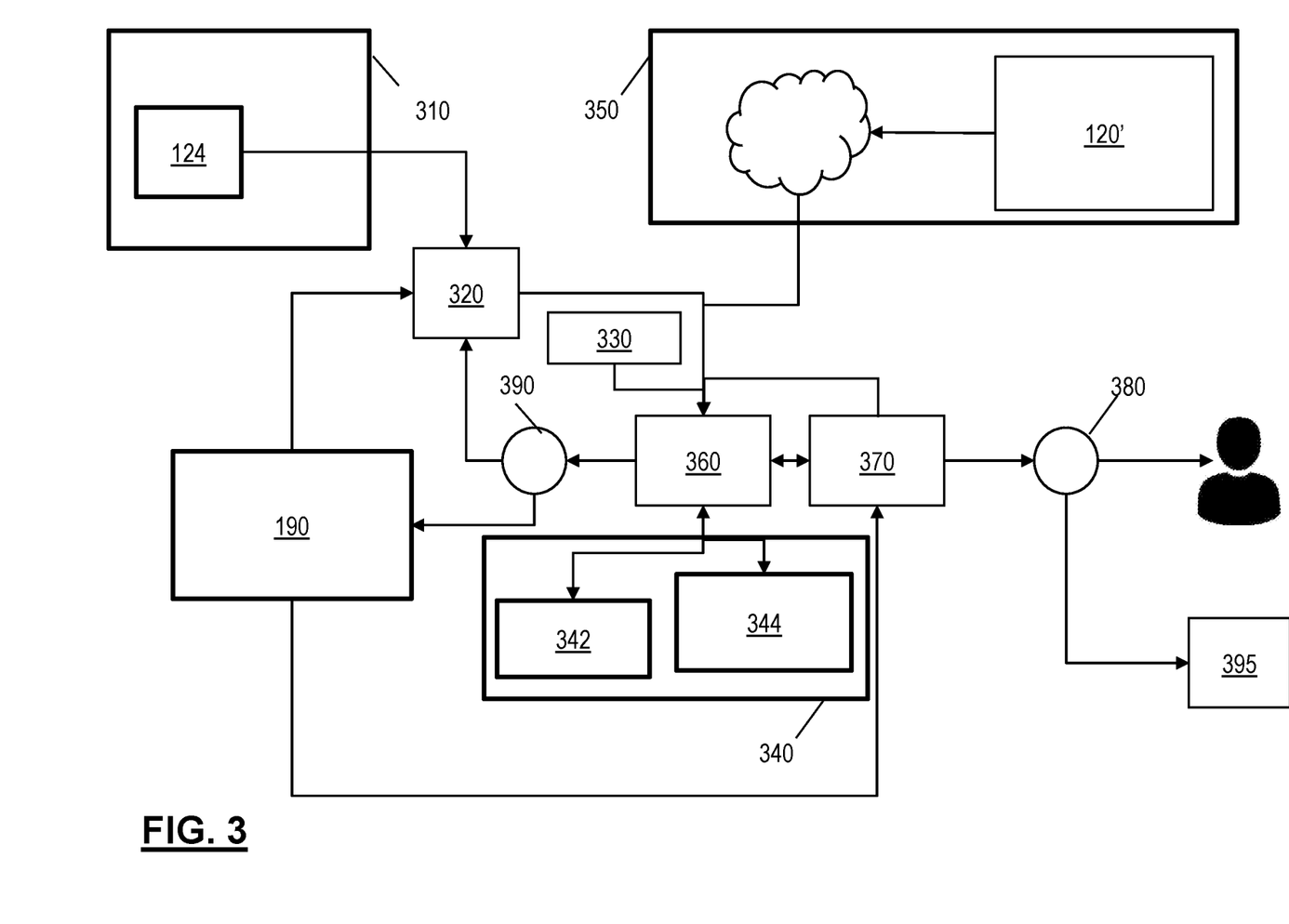
FIG. 3 depicts an example dataflow of a method for controlling an automated vehicle according to one or more embodiments.

FIG. 3 depicts an example dataflow of a method for driving complexity characterization and controlling an automated vehicle according to one or more embodiments. The control system 126 executes the method. The control system 126 receives sensor data from the one or more sensors of the vehicle 120 and computes a first complexity metrics based on the sensor data, at 310. The first complexity metrics based on the sensor data is computed as:

$$ISCM = \frac{\text{number of detections within predetermined threshold}}{\text{total number of detections}}$$

Here, ISCM is an individual sensor's complexity metric, which is a first complexity metric computed based on sensor data from the multiple (N) sensors 124 of the vehicle 120. Each detection by a sensor has a corresponding confidence score, and a confidence score above a predetermined threshold indicates if the detection is within a confidence level to take action based on the detection. The first complexity metric for a sensor "S" accordingly computes a ratio of a number of detections by the sensor "S" that have at least the predetermined threshold level of confidence score and the total number of detections by the sensor "S".

In one or more examples, the ISCM is computed separately for each sensor from the sensors 124. For example, $ISCM_1$ is computed for a first sensor (e.g.: front radar), $ISCM_2$ is computed for a second sensor (e.g. front LIDAR), $ISCM_3$ is computed for a third sensor (e.g. front camera), $ISCM_i$ is computed for an $i^{th}$ sensor (e.g. side radar), and so on for each sensor in the vehicle 120. It should be noted that the confidence score threshold value for each sensor can be different, which is a predetermined value for the computation, and which can be adjustable.

The control system 126 performs sensor fusion to combine the input received from the sensors 124 and further compute complexity metrics based on the sensor fusion data, at 320. Sensor fusion combines the sensory data or data derived from the disparate sources such that the resulting information has less uncertainty than would be possible when these sources were used individually. In one or more examples, the sensor fusion is performed on the sensory data from sensors with overlapping fields of view. The sensor fusion complexity metric is computed as:

$$SFCM = \frac{\text{number of fused objects}}{\text{total number of objects}}$$

Here SFCM is the sensor fusion complexity metric based on the sensor fusion results and objects detected without the sensor fusion. The SFCM is computed as a ratio of the number of objects detected as a result of the sensor fusion (which eliminates duplicate objects) and the total number of objects detected by the sensors 124.

Further, the control system 126 performs object tracking and computes an object tracking complexity metric, at 330. The object tracking includes determining the number of stably tracked objects from the total number detected by the sensors 124. For example, the object tracking continuously monitors if a detected object exists in at least a predetermined proportion of frames in a set of successive frames that are sensed by the sensors 124. For example, consider an example scenario where an object is detected in a frame-1. The object detection is assigned an initial stability score. If the same object is detected in one or more additional frames that are further sensed by the sensors 124, the stability score of the object may be incremented or maintained. If the object is not sensed in the successive frames, the stability score is reduced. If the stability score of the object is above a predetermined threshold, the confidence of the object detection is considered high enough to make a decision regarding maneuvering the vehicle 120 based on the object. An object that has a stability score above the predetermined threshold is considered a 'stably detected' object.

The object tracking complexity metric is computed as:

$$OTCM = \frac{\text{number of stably tracked objects}}{\text{total number of tracked objects}}$$

Here, a number of stably tracked objects is the number of objects with stability score above the predetermined threshold in a predetermined number of recent frames. The total number of tracked objects is the number of objects that have been tracked in the same frames. The number of frames to use for the analysis is an adjustable parameter and a predetermined value at the time of computation. In one or more examples, the number of frames may be based on a predetermined interval for which the sensor data is received and analyzed.

The control system 126 receives environmental data for the region 220 FIG. 2, at 340. The environmental conditions include, but are not limited to, lighting conditions (dark, bright etc.), weather conditions (rainy, snowy, dry etc.), road surface condition (slippery, construction in progress etc.), traffic conditions (light traffic, high traffic etc.), and other such environmental factors. The environmental factors are received from one or more sources. For example, the lighting conditions are determined using light sensors included in the sensors 124 of the vehicle 120. The rainy/dry conditions can be determined using humidity sensors and/or state of automatic wipers equipped in the vehicle 120. Further, the road surface conditions are determined using sensors 124 such as camera/suspension sensors and the like. In the above examples using the sensors 124, the control system 126 predicts the conditions in the region 220 based on the sensor data from the sensors 124 at the present region 210.

Alternatively, or in addition, the control system 126 receives the conditions from other sources, such as designated computer servers monitoring and providing such data for the region 220. For example, the weather conditions may be received from a first source, such as a weather computer server 342, and the traffic conditions are received from a traffic computer server 344. Other such data sources (not shown) may be included for the other types of data received. It should be appreciated that the above list is a few examples and that, in other embodiments, different environmental data may be received from different sources than those listed above.

The environmental data further includes quantitative attributes of the communication network available in the region 220. For example, the quantitative attributes include, but not limited to, signal strength, network type (e.g. 4G, 3G etc.), level of service, and the like. The environmental data further includes age of the available information from the region, such as the timestamp of the last reported traffic/road related incident in the region 220 received via the communication network.

Further yet, the environmental data includes quantitative attributes about the GPS network in the region 220. For example, signal to noise ratio, number of GPS satellites, receiver type (e.g. L1/L5), dilution of precision measures, and the like.

The environmental data further includes quantitative attributes about the map of the region 220. For example, the map attributes include curvature of road in the map, number of lanes, number of intersections, complexity of the intersections (predetermined values associated with the intersections based on number of lanes, number of traffic incidents empirically reported at the intersection, etc.), number of attributes associated with the region (e.g. X curves+Y intersections), and the like.

The control system 126 further receives complexity information from other vehicles 120', at 350. The other vehicles 120' are selected based on the other vehicles 120' traveling through the region 220 within a predetermined interval. The control system 126 receives the complexity information from the other vehicles 120' via the communication system 128.

Referring to FIG. 3, the control system 126 determines a scene complexity metric based on the one or more complexity metrics received/computed and the one or more quantitative attributes received/computed, at 360. The scene complexity computation is performed in one or more examples as:

$p_i = f(x_1, x_2, \ldots, x_t);$ $r = \Sigma_{i=1}^m w_i p_i$

Here, r is a complexity level indicating automated drivability of the vehicle 120 in the region 220 that is computed based on each property $p_i$, which represents each of the complexity metrics and attributes computed/received (e.g., ISCM, SFCM, OTCM, environment metrics). Each property $p_i$ is computed as a function of the corresponding parameters of interest (e.g. radar/camera/lidar, ambient light, etc.).

In one or more examples, each property is associated with a weighting value $w_i$ that is used during computation of the complexity level r. The weight values are predetermined values at the time of computation. In one or more examples, the weight values are adjustable. Further yet, in one or more examples, the weight values are dynamically computed by the control system 126, for example, using machine learning based on historic data.

Besides explicitly modeling the complexity level r as the weighted summation of those properties mentioned previously, a machine learning technique such as long short term memory (LSTM) can be used over a time-series of raw or processed sensor data to automatically predict the complexity level r. It should be noted that LSTM is one example of time-series analysis that can be used to determine the driving complexity result, and that in other embodiments any other state based learning algorithm can be used for the analysis. The analysis determines the driving complexity level at the present time t based on earlier instances in the predetermined interval being analyzed.

The machine learning techniques, such as the LSTM, automatically and dynamically predicts the complexity level without a fixed equation and weighting factors as in case of the equations above. In one or more examples, the machine learning also uses the ISCM, SFCM, and other properties as the input and then automatically learns to use these properties to predict the complexity level r based on a dynamically learned set of weights. Alternatively, in one or more examples, the raw sensor data is directly sent into the machine learning algorithm (e.g.: LSTM), which can directly predict, from the raw sensor data, the complexity level r (without specifying IS CM, SFCM or other properties and weights). The complexity level r can then be compared with a predetermined threshold to determine drivability. In one or more examples, the machine learning output is the drivability resulting from such a comparison.

Figure 4:
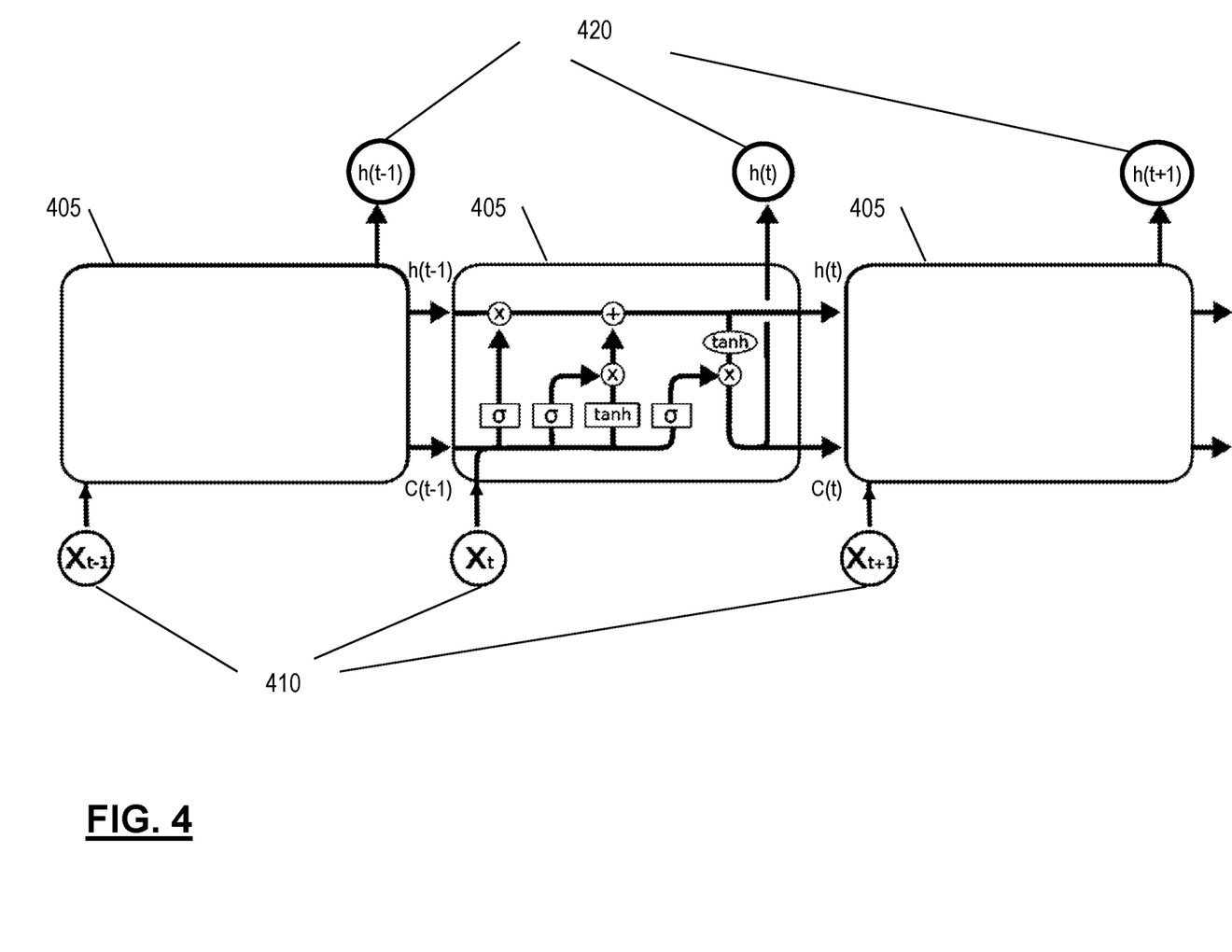
FIG. 4 depicts an example implementation of a time-series analysis for determining operational mode switching according to one or more embodiments.

FIG. 4 depicts an example implementation of the LSTM for determining driving complexity according to one or more embodiments. Here LSTM blocks are stacked together, with each LSTM block 405 forwarding its output to a next LSTM block 405. It should be noted that although only three LSTM blocks are depicted, in other examples a different numbers of LSTM blocks can be used.

In the example implementation, raw or processed sensor data are input as a time-series 410 X(t) at the present time t. Further, the LSTM block receives as input h(t−1), which is the output from the previous LSTM unit 405 and C(t−1), which is the "memory" of the previous LSTM unit 405. Each single LSTM block 405 predicts the complexity level r by considering the current input (X(t)), previous output (h(t−1)) and previous memory (C(t−1)). The LSTM block 405 generates a new output (h(t)) and alters its own memory (C(t)). The output is generated according to the following expressions:

$f_t = \sigma(W_f[h_{t-1}, x_t] + b_f)$ $i_t = \sigma(W_i[h_{t-1}, x_t] + b_i)$ $\tilde{c}_t = \tanh(W_c[h_{t-1}, x_t] + b_c)$ $$o_t = \sigma(W_o[h_{t-1}, x_t] + b_o)$$

$$c_t = f_t + C_{t-1} + t_i * \tilde{c}_t$$

$$h_t = o_t * \tanh(c_t)$$

Here, the sensor data X(t) at time t includes the raw data directly obtained from the sensors 124, for example, pixels from imagery sensors, point cloud from Lidar or radar sensors, the temperature information from temperature sensors, etc.. Alternatively, or in addition, the sensor data includes processed raw sensor data, for example, the detection objects information and the tracking information from image sensors, Lidar sensors, or radar sensors. Alternatively, or in addition, the input includes the attributes described herein, such as the properties used in the weighted summation method. The output h(t) at time t is the predicted complexity level r.

The LSTM (or any other time series) analysis facilitates the system to automatically learn when a complex situation is encountered and generate a robust detection by considering both spatial and temporal information. For example, as the vehicle 120 is moving through different regions, the time series analysis indicates that the complexity of the regions is increasing over a period of time and may predict a high complexity level r as the output.

In the above computations, the complexity level is computed either using m different properties or through certain machine learning methods such as LSTM to which the control system 126 has access. The properties used by the control system 126 can be adjustable. For example, in one or more examples, the control system 126 uses the sensor data and the sensor fusion only. Alternatively, in one or more examples, the control system 126 uses the environmental data from other vehicles 120' and the external data sources such as computer servers. Thus, the value of m can be different in different examples.

The complexity level r is used to determine if computational resources are available to analyze the available information to provide automated driving at Level 3/4 for the vehicle 120, at 370 FIG. 3. For example, the complexity level r is compared with predetermined threshold value, and if r >threshold, the control system 126 seeks remediation measures (Level 4), issues an alert for the driver (Level 3), or requests a takeover by the driver (Level 3) as the vehicle 120 drives through the region 220, as shown at 380.

In one or more examples, if the complexity level r is smaller than the predetermined threshold, the control system 126 continues to provide the automated driving assistance through the region 220. In one or more examples, the control system 126 compares the complexity level r with another threshold value to check if the computing system equipped in the vehicle 120 can provide the automated driving assistance by itself, at 390. If the computing system does not have the resources to perform the analysis for the automated driving assistance, the control system 126 seeks the assistance of the external computing system 190 via the communication system 128, at 390. The control system 126 allocates the computational resources for the automated driving assistance, for example between the computation resources available in the vehicle 120 and the external computing system 190. If the computing system of the vehicle 120 has the computational resources to analyze the available information, the automated driving assistance is determined by the computing system itself. The automated driving assistance is executed, at 395.

Executing the automated driving assistance includes performing one or more maneuvers for the vehicle by sending corresponding commands to the one or more actuators of the vehicle to adjust the vehicle kinematics (e.g. speed, acceleration, steering angle etc.).

In one or more examples, the thresholding is used to determine whether to issue a takeover request (Level 3) or employ elastic computing resources (Level 4), or to continue with the automated driving assistance based on the complexity level r. However, the LSTM may directly output the decision results as h(t) without explicitly outputting the complexity level r and a threshold depending on different implementation preference.

Figure 5:
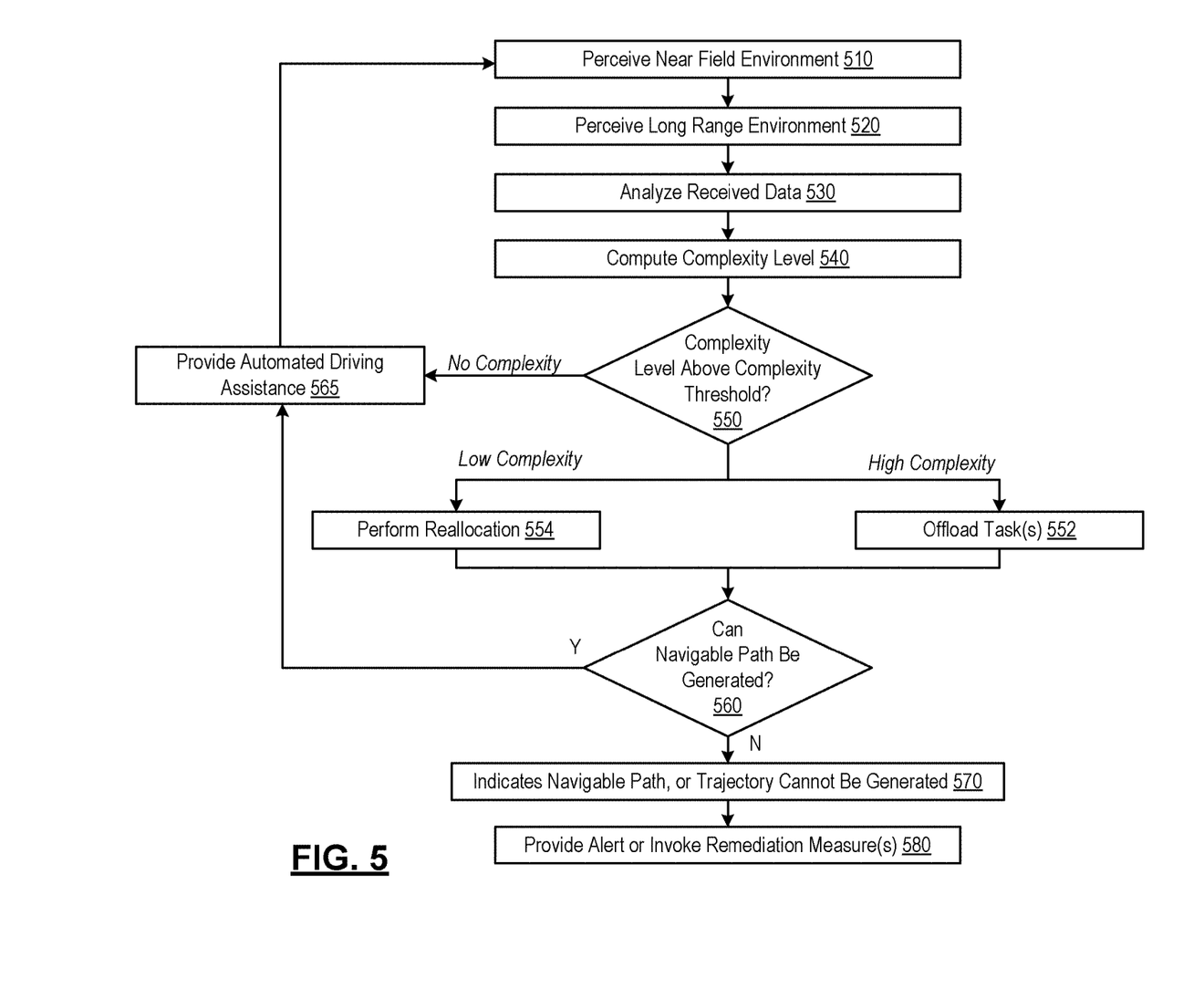
FIG. 5 depicts a flowchart of an example method for controlling an automated vehicle according to one or more embodiments.

FIG. 5 depicts a flowchart of an example method for determining automated driving complexity and controlling an automated vehicle according to one or more embodiments. The method includes perceiving a near field environment for the vehicle 120, at 510. The near field environment includes the environmental data for the region 210 in which the vehicle 120 is presently traveling. The environmental data for the near field can be obtained from one or more sources, such as the sensors 124 from the region that is within a line of sight of the sensors 124.

The method further includes perceiving a long range environment, at 520. The long range environment is perceived by obtaining environmental data for a region that is out of range of the sensors 124 of the vehicle 120. The environmental data for the long range region, for example region 220 is obtained using the communication system 128 via one or more external data sources such as other vehicles, data service providers, and so on. Further, in one or more examples, the environmental data for the region 220 is obtained by predicting the environmental factors in that region using time series analysis and/or using empirical data.

Further, the method includes analyzing the received data for performing object detection and maintaining an object list and computing environment metrics based on the object detection for the region 210 and the region 220, at 530. The object detection includes determining static objects (stationary e.g. road signs, buildings) and dynamic objects (moving e.g. other vehicles, pedestrians) in the region being analyzed. The object detection and analysis can be performed using known object detection techniques for different types of sensor data and/or using sensor fusion techniques by combining the sensor data obtained from the multiple sensors 124.

The method further includes computing the complexity level r for the region 220, at 540. The complexity level computation includes computing one or more different complexity metrics, which include the complexity (ISCM) based on each of the different sensors 124, the complexity (SFCM) based on sensor fusion detection, the complexity based on object tracking across multiple frames (OTCM), and the like. Each of these complexities represents a property (pi) as described in the calculations described earlier. Further, the environmental data obtained from one or more sources, such as the traffic conditions, weather conditions, network conditions, road surface conditions, and the like are used to compute the confidence level r as described above. The environmental factors also represent the different properties (pi). The weight values assigned to each property is accessed and used for the computations. Alternatively, or in addition, a complexity level r can be predicted based on a time series analysis such as the LSTM.

The method further includes predicting if the complexity level r is above a complexity threshold that the control system 126 of the vehicle 120 can handle for providing automated driving assistance, at 550. In one or more examples, the complexity level r is compared with a predetermined complexity threshold value(s). Alternatively, or in addition, the decision can be predicted directly from the LSTM without outputting the complexity level r and comparing with the predetermined complexity threshold value(s) explicitly.

If the control system 126 determines that the complexity level is manageable for the control system 126 in the current allocation of computational resources itself, i.e. r<low-complexity threshold, the control system 126 continues to analyze the environmental data for the region 220 and provide automated driving assistance for the vehicle when traveling through the region 220, at 565. Analyzing the environmental data and providing the automated driving assistance includes generating a trajectory for the vehicle 120 through the region 220. The method is continuously executed by the control system 126. Executing the trajectory includes maneuvering the vehicle 120 according to the trajectory.

Alternatively, if the control system 126 determines that the complexity level is higher than what can be analyzed by the current configuration of the computational resources, the control system 126 further analyzes the complexity level to check if a trajectory can be determined by reallocating the computational resources within the computing system of the vehicle 120 or if the analysis is unmanageable by the computing system. For example, the control system 126 checks if the complexity level is such that low-complexity threshold<r<high-complexity threshold.

If the complexity level is unmanageable for the control system 126 by itself, i.e. r>high-complexity-threshold, the control system 126 can offload at least a subset of the automated driving tasks to an additional computing system, at 552. Offloading the tasks may include assigning computational resources from the external computing system 190 to perform the subset of tasks to complete the analysis of the environmental data to determine the trajectory of the vehicle 120 in the region 220.

The external computing system 190 upon receiving the request to provide the automated driving assistance by generating the trajectory for the vehicle 120, indicates if a navigable path can be generated by the external computing system 190, at 560. For example, the external computing system 190 may also not be able to generate a safe trajectory for the vehicle 120 prior to the vehicle 120 reaching the region 220. In such cases, the external computing system 190 indicates to the control system 126 that a navigable path, or trajectory cannot be generated, at 570. In such cases the control system 126 provides an alert to the driver, at 580 or invokes remediation measures (i.e., performs a minimal risk condition maneuver that slows/stops the vehicle and pulls to the side of the road).

The alert indicates to the driver that manual takeover is required. In one or more examples, the alert also indicates a time interval, such as 5 seconds, 10 seconds, or the like in which the driver control must be taken. The alert may be provided in one or more ways. The alert may be provided via the DVI 180. Alternatively, or in addition, the alert may be provided as haptic feedback via the steering. Alternatively, or in addition, the alert may be provided as audio feedback via speakers installed in the vehicle 120. Additional and/or alternative forms of alert may be provided in other embodiments, such as via a mobile device of the driver that is registered with the control system 126.

Under Level 3 operation, after the indicated time interval, the driver has to take control of at least a subset of tasks for maneuvering the vehicle 120, such as the steering and the acceleration. Under Level 4 operation, the control system 126 executes in the minimal risk condition, until the driver initiates a switch to re-engage the fully automated operational mode (Level 4). Upon switching to the fully automated mode, the control system 126 continues to execute the method described herein to monitor the automated driving complexity of the vehicle 120.

If the external computing system 190 can generate the trajectory, the external computing system 190 indicates as such, at 560, and generates and sends the trajectory to the control system 126 via the communication system 128, at 565. The received trajectory is then executed by the vehicle 120 for the region 220, at 565. The method is continuously executed by the control system 126. Executing the trajectory includes maneuvering the vehicle 120 according to the trajectory.

Alternatively, based on the complexity comparison, if the control system 126 determines that the complexity of the region 220 is low, the control system 126 performs a reallocation of the computational resources of the computing system of the vehicle 120 to facilitate generating a trajectory for the region 220, at 554. For example, the reallocation of the computation resources can include changing loop times for analyzing sensory data. In one or more examples, the loop times for analyzing sensor data from sensors facing a particular side of the vehicle 120, e.g. rear, or right side, is reduced. Alternatively, or in addition, algorithm used for analyzing sensors facing a particular side of the vehicle 120 is changed to an algorithm that uses lesser computational resources. It should be noted that any other adjustments of the computational resources can be performed in other embodiments.

The technical solutions described herein thus facilitate driving complexity determination system for an automated vehicle. The technical solutions described herein further facilitate the control system of the vehicle to attempt to continue operating in the fully-automated operational mode when the complexity of the upcoming region is manageable for the present configuration of the computing system of the vehicle. Further, the technical solutions determine if a different configuration of the computing system, with computational resources reallocated can manage generating and executing a trajectory in the fully-automated operational mode for the upcoming region. Further yet, if the computing system of the vehicle is unable to generate the trajectory, the technical solutions described herein also facilitate checking if an external computing system can be used to generate the trajectory for the vehicle to travel through the upcoming region. If the external computing system also cannot generate the trajectory within a specific time (before the vehicle reaches the upcoming region) the technical solutions described herein facilitate the vehicle to request driver intervention or execute a minimal risk condition maneuver. Further yet, the technical solutions described herein facilitate alerting the driver to take over the control of the vehicle at least a predetermined time interval prior to reaching a region with a predicted complexity level in which a trajectory cannot be generated by the automated vehicle.

The technical solutions described herein facilitate measuring complexity of the environment of an upcoming region of an automated vehicle based on static objects (i.e., clutter) and dynamic elements (moving objects, environmental conditions: time of day, year, etc.). The technical solutions can further provide indication of complex environment of the upcoming region and allow sufficient time to bring driver back in the loop to take over control of the vehicle (Level 3) or offloads/reallocates system tasks to continue operating in the fully-automated operational mode (Level 4). In one or more examples, the technical solutions employ direct sensing & communications to track increasing complexity of the environment. Further yet, the technical solutions facilitate providing system confidence information to the ADAS or to the driver via the DVI.

The technical solutions described herein thus improve the safety of operation of an automated driving system. Further yet, the technical solutions described herein facilitate an improvement of a computing system that the system uses to control the vehicle. Further yet, the technical solutions described herein facilitate the control system to generate and provide commands that cause the vehicle kinematics to be adjusted such as, causing the vehicle to move at a particular speed, accelerate at a particular rate, steer in a particular direction, etc. The technical solutions described herein adjust the vehicle kinematics by generating and sending commands to one or more actuators/motors in the vehicle.

It should be noted that in the above description the threshold values are few possible examples, and that in other embodiments, different and or fewer/additional threshold values may be used. Further, the types of alerts described are examples, and that in other embodiments, different alerts may be generated. In one or more examples, the threshold values and the alert types may be configurable by a user of the vehicle 120.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and the like, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for controlling an automated driving system of a vehicle, the method comprising:
    computing a complexity metric, in real time, of an upcoming region along a route that the vehicle is traveling along;
    adjusting the complexity metric, in real time, of the upcoming region along the route that the vehicle is traveling along based on parameters received from crowd-sourcing aggregation from other vehicles that are have passed through the upcoming region within a predetermined interval;
    in response to the complexity metric being below a predetermined low-complexity threshold, determining a trajectory for the vehicle to travel in the upcoming region using a computing system of the vehicle; and
    in response to the complexity metric being above a predetermined high -complexity threshold:
        instructing an external computing system to determine the trajectory for the vehicle to travel in the upcoming region; and
        performing a minimal risk condition maneuver of the vehicle when the trajectory cannot be determined by the external computing system.

2. The method of claim 1, further comprising:
    in response to the complexity metric being between the low-complexity threshold and the high-complexity threshold:
        adjusting the computing system of the vehicle by reallocating computational resources of the computing system of the vehicle;
        instructing the adjusted computing system of the vehicle to determine the trajectory for the vehicle to travel in the upcoming region; and
        performing the minimal risk condition maneuver of the vehicle when the trajectory cannot be determined by the adjusted computing system.

3. The method of claim 1, wherein computing the complexity metric comprises computing an individual sensor's complexity metric based on sensor data captured by one or more sensors of the vehicle.

4. The method of claim 1, wherein computing the complexity metric comprises computing a sensor fusion complexity metric based on sensor fusion data that is determined based on sensor data captured by one or more sensors of the vehicle.

5. The method of claim 1, wherein the complexity metric is computed using machine learning based on a time series analysis of sensor data captured by one or more sensors of the vehicle.

6. The method of claim 1, wherein the complexity metric is computed as $r=\Sigma_{i=1}^{m} w_i p_i$, where $p_i$ is an $i^{th}$ parameter comprising an environmental factor or a complexity-value computed using sensor data from one or more sensors of the vehicle, $w_i$ is a weight associated with the $i^{th}$ parameter, and m is a total number of parameters.

7. The method of claim 1, further comprising generating an alert for a driver of the vehicle to take control of the vehicle at least a predetermined time interval prior to reaching the upcoming region.

8. An automated driving system of a vehicle comprising:
one or more sensors;
a computing system; and
a controller coupled with the one or more sensors and the computing system, the controller configured to determine an operational mode of the automated driving system, the determining the operational mode of the automated driving system comprising:
computing a complexity metric, in real time, of an upcoming region along a route that the vehicle is traveling along;
adjusting the complexity metric, in real time, of the upcoming region along the route that the vehicle is traveling along based on parameters received from crowd-sourcing aggregation from other vehicles that have passed through the upcoming region within a predetermined interval;
in response to the complexity metric being below a predetermined low-complexity threshold, determining a trajectory for the vehicle to travel in the upcoming region along the route that the vehicle is traveling along, the trajectory to be determined using an internal computing system of the vehicle; and
in response to the complexity metric being above a predetermined high-complexity threshold: instructing an external computing system to determine the trajectory for the vehicle to travel in the upcoming region, performing a minimal risk condition maneuver of the vehicle if the trajectory cannot be determined by the external computing system, and
adjusting the computing system of the vehicle by reallocating computational resources of the computing system of the vehicle, wherein the reallocating the computational resources comprises reducing a loop time for analyzing sensor data from the one or more sensors.

9. The automated driving system of claim 8, wherein the determining the operational mode of the automated driving system further comprises:
instructing the adjusted computing system of the vehicle to determine the trajectory for the vehicle to travel in the upcoming region; and
performing the minimal risk condition maneuver of the vehicle if the trajectory cannot be determined by the adjusted computing system.

10. The automated driving system of claim 8, wherein computing the complexity metric comprises computing a sensor fusion complexity metric based on sensor fusion data that is determined based on the sensor data captured by the one or more sensors.

11. The automated driving system of claim 8, wherein the complexity metric is computed as $r=\Sigma_{i=1}^{m} w_i p_i$, where $p_i$ is an $i^{th}$ parameter comprising an environmental factor or a complexity-value computed using the sensor data from the one or more sensors of the vehicle, $w_i$ is a weight associated with the $i^{th}$ parameter, and m is a total number of parameters.

12. The automated driving system of claim 8, wherein the controller determines the trajectory of the upcoming region using the internal computing system or the external computing system based on a machine learning algorithm that computes the complexity metric of the upcoming region using a time series analysis of the sensor data captured by the one or more sensors of the vehicle.

13. The automated driving system of claim 8, wherein the controller is further configured to generate an alert for a driver of the vehicle to take control of the vehicle at least a predetermined time interval prior to reaching the upcoming region.

14. An automated vehicle comprising:
a communication system; and
a controller coupled with the communication system, the controller configured to determine an operational mode of an automated driving system, the determining the operational mode of the automated driving system comprising:
computing a complexity metric, in real time, of an upcoming region along a route that the vehicle is traveling along;
adjusting the complexity metric, in real time, of the upcoming region along the route that the vehicle is traveling along based on parameters received from crowd-sourcing aggregation from other vehicles that have passed through the upcoming region within a predetermined interval;
in response to the complexity metric being below a predetermined low-complexity threshold, determining a trajectory for the vehicle to travel in the upcoming region using a computing system of the vehicle; and
in response to the complexity metric being above a predetermined high-complexity threshold:
instructing an external computing system to determine the trajectory for the vehicle to travel in the upcoming region;
performing a minimal risk condition maneuver of the vehicle if the trajectory cannot be determined by the external computing system; and
adjusting the computing system of the vehicle by reallocating computational resources of the computing system of the vehicle, wherein the reallocating the computational resources comprises reducing a loop time for analyzing sensor data from one or more sensors, wherein reducing the loop time further comprises reducing the loop time from sensors facing a particular side of the vehicle.

15. The vehicle of claim 14, wherein computing the complexity metric comprises:
computing an individual sensor's complexity metric based on the sensor data captured by the one or more sensors of the vehicle;
computing a sensor fusion complexity metric based on sensor fusion data that is determined based on the sensor data captured by the one or more sensors of the vehicle; and
computing an object tracking complexity metric based on a number of stably tracked objects from the sensor data and a total number of objects tracked by the one or more sensors of the vehicle.

16. The vehicle of claim 14, wherein the complexity metric is computed as $r=\Sigma_{i=1}^{m} w_i p_i$, where $p_i$ is an $i^{th}$ parameter comprising an environmental factor or a complexity-value computed using the sensor data from the one or more sensors of the vehicle, $w_i$ is a weight associated with the $i^{th}$ parameter, and m is a total number of parameters.

17. The vehicle of claim 14, wherein the controller is further configured to generate an alert for a driver of the vehicle to take over control of the vehicle at least a predetermined time interval prior to reaching the upcoming region.

18. The vehicle of claim 14, wherein the complexity metric is computed using machine learning based on a time series analysis of the sensor data captured by the one or more sensors of the vehicle.

* * * * *